2 Sheets—Sheet 2.
W. F. COCHRANE.
Harvester.
No. 49,024. Patented July 25, 1865.
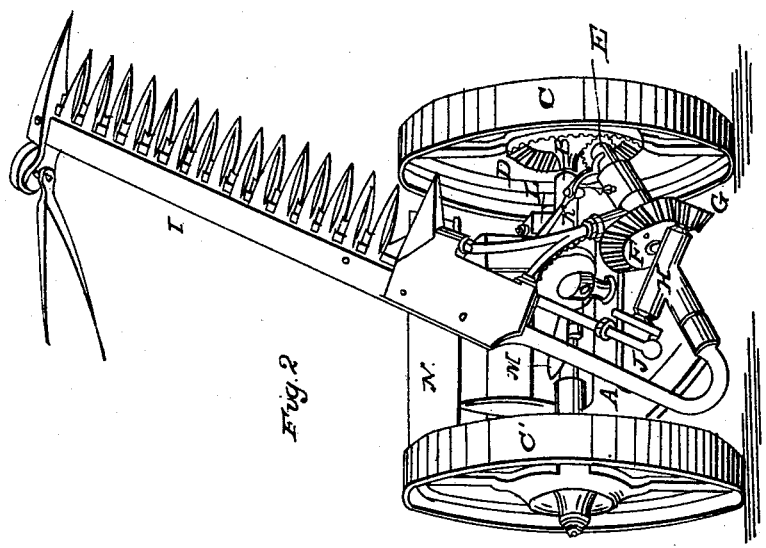
WITNESSES
INVENTOR

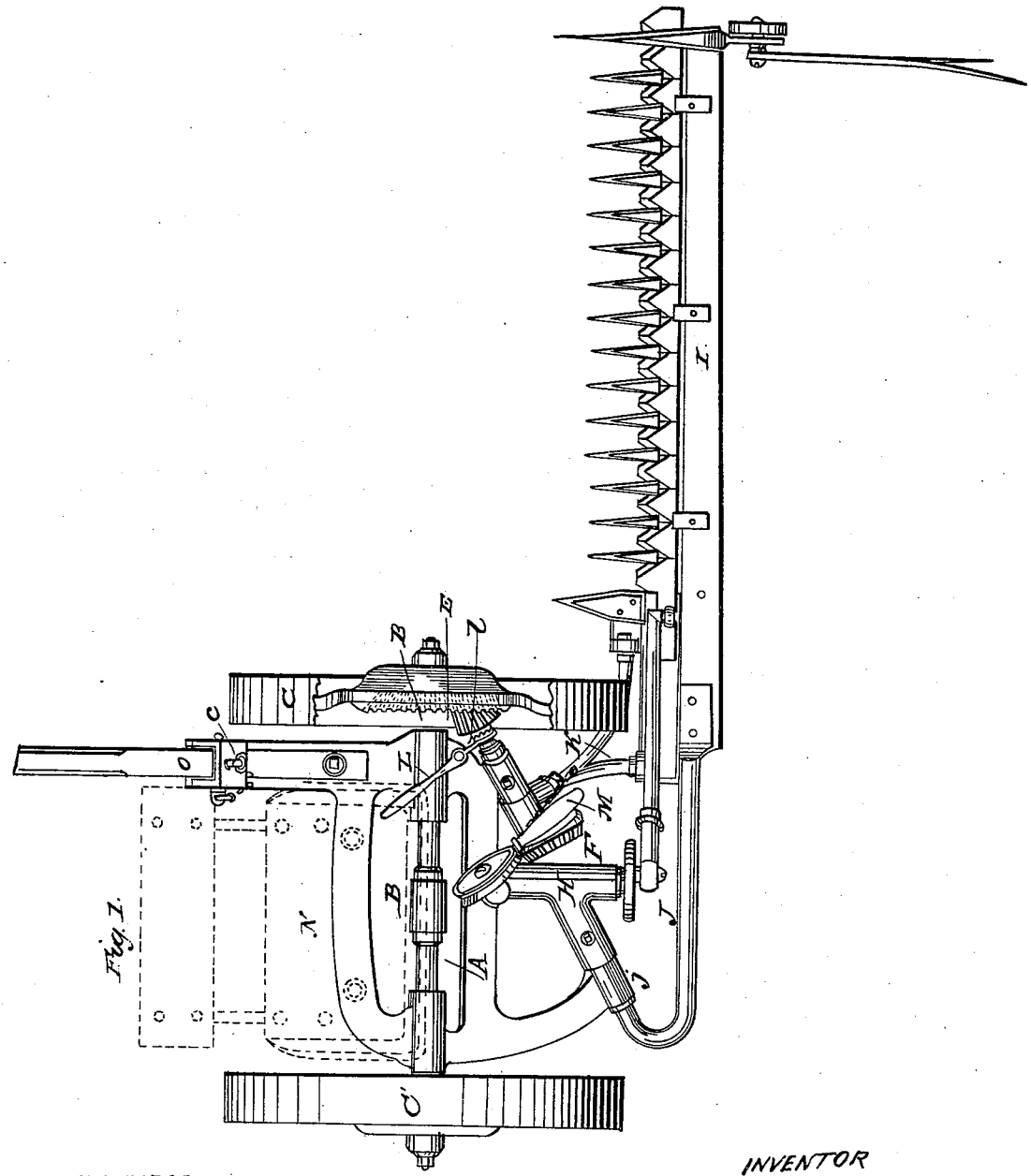

UNITED STATES PATENT OFFICE.

WM. F. COCHRANE, OF SPRINGFIELD, OHIO, ASSIGNOR TO HIMSELF, B. H WARDER, AND J. C. CHILD, OF SAME PLACE.

IMPROVEMENT IN HARVESTING-MACHINES.

Specification forming part of Letters Patent No. 49,024, dated July 25, 1865.

*To all whom it may concern:*

Be it known that I, WILLIAM F. COCHRANE, of Springfield, in the county of Clarke and State of Ohio, have invented a new and useful Improvement in Harvesters, of which the following is a full, clear, and exact description, reference being had to the accompanying drawings, which make part of this specification, and in which—

Figure 1 shows a plan view of a mowing-machine embracing my improvement, with the cutting apparatus resting on the ground; and Fig. 2, a perspective view of the same, with the cutting apparatus turned up and supported by the main frame.

It is the object of my invention so to construct a harvester that its cutting apparatus may be capable of conforming to the undulations of the ground over which it passes, and of being folded upon the main frame to facilitate its transportation from field to field without the use of a joint in the finger-beam; and to this end the improvement herein claimed consists, first, in combining the finger-beam of a harvester with the main frame by a single joint in such manner that the finger-beam may be folded over upon the frame and between the wheels; second, in connecting the finger-beam to the main frame by an extension-arm bent at an acute angle and journaled on the frame; third, in so combining the main frame, cutting apparatus, and gearing that the cutting apparatus may be turned over upon the frame between the wheels without deranging the gearing; fourth, in driving the cutters by means of an inverted bevel-gear on the driving-wheel and a counter-shaft in line with the bent end of the extension-bar; fifth, in combining a counter-shaft arranged in line with the bent end of the extension-bar with a crank-shaft arranged obliquely to the bar and counter-shaft, and revolving around them in such manner as always to keep the wheels in gear; sixth, in pivoting both the extension-arm and brace so as to turn on an axis coincident with the counter-shaft.

In the accompanying drawings, which exemplify one mode of carrying out the objects of my invention, my improvement is shown as applied to a two-wheeled mowing-machine. In this instance a main frame, A, of metal is shown as supported and oscillating upon an axle, B, turning in long boxes in the frame, and having the wheels C C' mounted upon it. Instead of the usual backing-ratchets this shaft may be cut in two, if preferred, and a single ratchet be used to connect the two parts.

An inverted bevel-gear, D, is formed on the inner wheel, C, and drives a bevel-pinion, E, on a counter-shaft arranged obliquely to the main axle and mounted in suitable bearings in the main frame.

A bevel-wheel, F, on the counter-shaft drives a corresponding pinion, G, on the crank-shaft, which turns in a long pipe-box or bearing, H, at right angles to the finger-beam, but oblique to the counter-shaft, and drives the cutters by a crank and pitman in the usual way.

The finger-beam I is connected to the main frame by means of an extension-bar or coupling-arm, J, the lower end of which, in this instance, is rigidly secured to the heel of the finger-beam, while its upper end is bent at an acute angle—say about thirty degrees, more or less—and inserted into a socket or bearing, *j*, in the frame, so as to turn freely therein. The rear end of the main frame droops below the axle, and its stubble side is longer than the other to conform to the bent angle of the extension-bar. The crank-shaft is mounted in a bearing on the bent end of the extension-bar, which is arranged in the same plane with the counter-shaft. The crank-pinion G is then free to roll round the bevel-wheel F when the bar is lifted and still remain in gear. The finger-beam is also connected to the main frame by means of a forked brace, K, turning on a bearing coincident with the counter-shaft.

The mechanism is thrown into or out of gear by a shipping-lever, L, which controls a ratchet, *l*, on the counter-shaft, which ratchet also serves as a backing-ratchet.

The cutting apparatus is raised by a lever, M, segment, and chain in the usual way. A seat, N, for the driver is mounted on the frame.

A tongue, O, is pivoted to the frame, so as to play vertically in a bracket, *o*, provided with a detent to hold it in any desired position.

The operation is so obvious as scarcely to require description. As the machine is drawn through the field the main frame oscillates freely on its axle, while the cutting apparatus plays freely on its pivot to conform to the undulations of the surface of the ground. The position of the parts when thus operating is shown in Fig. 1. To turn up the cutting apparatus the driver raises lever M, which causes the finger-beam to fold over on the frame between the wheels, as shown in Fig. 2, where it is out of the way of the driver. The machine can then readily be transported from place to place. The brace K supports the finger-beam while on the ground, turns with it when folded upon the frame, and supports it securely while so folded.

My invention might readily be adapted to a one-wheeled machine, but I prefer to use two wheels.

It is obvious that my improvement might be used with a joint in the heel of the finger-beam, if preferred, but such additional joint is deemed unnecessary to the successful operation of the machine.

It will be seen that by arranging the counter-shaft and extension-bar obliquely I am enabled to secure a strong, simple, and compact arrangement of the parts, and to fold the cutting apparatus on the frame between the wheels by the use of a single joint.

What I claim as my invention, and desire to secure by Letters Patent of the United States, is—

1. Folding the cutting apparatus upon the main frame and between the driving-wheels by the use of a single joint, substantially as described.

2. Connecting the finger-beam and main frame by an extension-bar bent at an acute angle and journaled in the frame, substantially in the manner described, for the purposes set forth.

3. The combination of the main frame and cutting apparatus with oblique gearing and a single joint, substantially as described, for the purpose of folding the cutting apparatus on the frame between the driving-wheels without deranging the gearing.

4. The combination of the inverted bevel-gear D with the counter-shaft, when arranged and operating as described.

5. The combination of the counter shaft and crank-shaft, when arranged and operating as described.

6. The combination of the extension-arm, brace K, and counter-shaft, when arranged and operating as described.

In testimony whereof I have hereunto subscribed my name.

WM. F. COCHRANE.

Witnesses:
WM. D. BALDWIN,
JOS. I. PEYTON.